US009467383B2

(12) United States Patent
Lin et al.

(10) Patent No.: US 9,467,383 B2
(45) Date of Patent: Oct. 11, 2016

(54) ITERATIVE OPTIMIZATION METHOD FOR SITE SELECTION IN GLOBAL LOAD BALANCE (75) Inventors: Qun Yang Lin, Beijing (CN); Jun Qing Xie, Beijing (CN); Zhi-Yong Shen, Beijing (CN); Xunteng Xu, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/397,429

(22) PCT Filed: Jun. 19, 2012

(86) PCT No.: PCT/CN2012/077142
§ 371 (c)(1),
(2), (4) Date: Oct. 27, 2014

(87) PCT Pub. No.: WO2013/189024
PCT Pub. Date: Dec. 27, 2013

(65) Prior Publication Data
US 2015/0098333 A1 Apr. 9, 2015

(51) Int. Cl.
*H04L 12/803* (2013.01)
*H04L 12/26* (2006.01)
*H04L 29/08* (2006.01)

(52) U.S. Cl.
CPC ......... *H04L 47/125* (2013.01); *H04L 43/0864* (2013.01); *H04L 67/101* (2013.01)

(58) Field of Classification Search
None
See application file for complete search history.

(56) References Cited

U.S. PATENT DOCUMENTS

| | | | |
|---|---|---|---|
| 6,292,832 B1 * | 9/2001 | Shah | H04L 29/06 709/223 |
| 6,446,121 B1 | 9/2002 | Shah et al. | |
| 6,810,411 B1 * | 10/2004 | Coughlin | H04L 29/12066 370/252 |
| 6,920,498 B1 * | 7/2005 | Gourlay | H04L 67/1008 709/200 |
| 7,254,626 B1 * | 8/2007 | Kommula | H04L 67/1008 709/217 |
| 7,284,051 B1 * | 10/2007 | Okano | H04L 67/1008 709/224 |
| 7,454,500 B1 * | 11/2008 | Hsu | H04L 67/1008 709/203 |
| 2001/0039585 A1 * | 11/2001 | Primak | H04L 29/12066 709/228 |
| 2011/0093522 A1 * | 4/2011 | Chen | H04L 67/1008 709/203 |
| 2011/0270964 A1 * | 11/2011 | Huang | H04L 29/12066 709/224 |
| 2015/0095494 A1 * | 4/2015 | Lin | H04L 67/1004 709/225 |

OTHER PUBLICATIONS

Huang, et al; "A DNS Reflection Method for Global Traffic Management"; Jun. 2010; USENIX ATC; pp. 1-6.*

* cited by examiner

*Primary Examiner* — Robert C Scheibel
(74) *Attorney, Agent, or Firm* — Brooks, Cameron & Huebsch, PLLC (57) ABSTRACT Systems, devices, and methods, including executable instructions and/or logic thereon, are provided for server site selection. A system includes a load balancing master configured to have a domain name server (DNS) capability with extensions to support iterative control and a manager capability to select among server sites to probe. The system includes a load balancing slave, communicatively coupled to the master, configured to have a DNS reflection capability to measure a round trip time (RTT) between the load balancing slave and a client local DNS server and an actor capability to respond to commands from the manager and to report a measured RTT to the load balancing master.

12 Claims, 4 Drawing Sheets

ITERATIVE OPTIMIZATION METHOD FOR SITE SELECTION IN GLOBAL LOAD BALANCE

BACKGROUND

Computing networks can include multiple devices including network devices such as routers, switches, and hubs, computing devices such as servers, desktop PCs, laptops, workstations, and peripheral devices, e.g., printers, facsimile devices and scanners, networked together across a local area network (LAN), a wireless local area network (WLAN), and/or wide area network (WAN).

Internet content and application providers usually place multiple copies of replicated servers with a unified domain name at data centers in distributed locations. One goal is to deliver content and applications quickly and accurately to a given client location. One challenge to doing so is to determine which server site is closest in proximity or lowest in latency to a given client. As many network applications rely on Domain Name System (DNS) address resolution, work has been conducted with DNS servers to resolve the domain names of content and application servers to IP addresses.

Global Load Balance (GLB) systems have been developed to select a server site for a client in view of response time and availability. Existing, commercially available GLB products rely on measurement methods or IP-geography mapping for site selection. However, due to network security and filtering, more and more local. DNS systems of clients do not respond to traditional measurement methods like ICMP (Internet Control Message Protocol), DNS, UDP (User Datagram Protocol), or TCP (Transmission Control Protocol) probe messages. Moreover, since mapping inaccuracy is a possibility, geographic distance may not reflect network proximity directly. As such, geographic-based mapping is used in GLB as an assistant for site selection.

DETAILED DESCRIPTION

Global Load Balance (GLB) systems have been developed to select a server site for a client in view of response time and availability. One task of a GLB system is to perform site selection of application servers among a set of geographically distributed data centers with faster response times and lower system costs.

Existing, commercially available GLB products rely on measurement methods or IP-geography mapping for site selection. However, due to network security and filtering, probe messages may be blocked before arriving to the local DNS systems of clients. Moreover, prediction based methods such as IP mapping may also introduce inaccuracies.

Embodiments of the present disclosure present solutions to determine a server site (e.g., content and/or application server site) from among replicated servers deployed at distributed locations. The embodiments propose an iterative framework for site selection, which can apply to all local DNS systems. The site selection process includes using a coarse selection phase, to select a first pool of server sites and then using a more granular, iterative phase to narrow a selection pool of servers further. In the coarse selection phase, a site selection method like DNS reply race, IP geography, etc. is leveraged to select a first result. Additionally, DNS reflection is used to collect a Round Trip Time (RTT) measurement between a first selected site and a local DNS server associated with a client user. The first site selection result and corresponding RTT measurement can be stored in a site selection system, e.g., a GLB system.

Further, the above operations are considered as a round of selection in the site selection system. In an iterative phase, multiple rounds of selection are executed on additional sites until all sites are processed or a selection threshold is reached. For example, selection results can converge as certain thresholds are reached. In each subsequent round the selection results are further narrowed and the accuracy of a given server site selection increases and can converge more rapidly. As such, system and methods are provided to achieve fast response (e.g., low latency) and lower system cost to server site selection.

Two site selection techniques in server site selection, e.g., GLB, include measurement-based (e.g., active and passive) and prediction-based (e.g., mapping based systems). Measurement-based solutions leverage active or passive measurement methods to collect the latency between the data center where the GLB system is located and the client's local DNS server. The latency is usually measured by Round Trip Time (RTT) as it reflects both the uplink and downlink network conditions. Active network measurement methods and tools include Ping, Traceroute, DNS probes, etc. as examples. Such active measurement techniques are used in GLB products from major vendors such as F5 Networks®, Citrix®, and Radware®. When receiving a DNS query for address resolution, the GLB system will trigger active measurement, trigger a Ping, from all the data centers to the local DNS server. After gathering all the measurement information, the GLB system will select the one with lowest RTT as the best site and send the DNS response back to the local DNS server.

However, the site selection process is not fast enough as only after all measurement results come back can the GLB system make a final selection decision. Another issue with active measurement-based solutions is limited reachability, as the client Local DNS (LDNS) may not respond to Ping or any other probing message from external network hosts if it is behind a firewall. According to recent testing results almost half of the local DNS servers, which are the probing points for site selection, do not respond to ping or DNS probes. In such cases, the GLB system is not able to determine a best site without complete/comprehensive measured data.

While GLB server site selection systems may be used in examples of the present disclosure for ease of reference, embodiments are not limited to this type of server site selection system. Embodiments may equally have applicability to Global Traffic Management (GTM) systems, Content Delivery Networks (CDNs), Peer-to-Peer (P2P) network systems (e.g., large scale online game systems), enterprise cloud service systems, etc.

An alternative approach to fetch latency between local DNS servers and content/application servers is through passive measurement. For example, latency can be calculated by examining the gap between Synchronized Acknowledgement (SYN-ACK) and Acknowledged (ACK) during a TCP three-way handshake. DNS systems can use TCP to communicate with each other when necessary (e.g., zone replication or long DNS reply), which makes it possible to collect. RTT with TCP three-way handshake. However, it is not commonly used for DNS-based GLB systems as DNS traffic is usually over UDP. Moreover, TCP three-way handshakes may also have some performance issue when the number of DNS queries increases.

DNS reflection from Microsoft® is a passive measurement method. The method leverages standard (e.g., according to existing and/or proposed Internet Engineering Task Force (IETF)) DNS operations to measure latency. DNS reflection can be applied to all local DNS servers. DNS reflection is leveraged to redirect a DNS query received from a local DNS server at a first DNS server to a second DNS server. Both of the DNS servers are deployed at the same location, usually in the same physical machine (e.g., in a GLB system in front of a data center). The time between when the first. DNS server returns the redirection response to when the second DNS server receives the redirected query from the same local DNS server is taken as the RTT between the local DNS server and the co-located site of the DNS reflection system. However, the DNS reflection is only a method to collect latency and no holistic GLB system has been implemented with it. Similar to active measurement based solutions, only when the RTT information of all sites has been collected can the GLB system perform site selection. The process is time consuming, especially when DNS reflection may only collect RTT between one site and the local DNS server each time.

DNS reply race from Cisco® is another passive measurement method, which leverages standard (e.g., according to existing and/or proposed Internet Engineering Task Force (IETF)) DNS operations to determine the site selection directly. The method may be applied to all local DNS servers. This technique triggers a DNS reply race from time synchronized GLB systems back to the local DNS server. The local DNS server will use the result in the first response as a selected site. The selected site determined by DNS reply race is based on One Way Delay (OWD) which may not reflect a true RTT due to a route asymmetry phenomenon in the Internet. Furthermore, the GLB systems can not get the information on which site has been selected as the race result is not sent back to the GLB system. Further, to prevent Distributed Denial of Service (DDoS) attacks resulting from source IP address spoofing, reverse path checking has been used in edge routers. This may prohibit the normal running of DNS reply race since the DNS reply race utilizes source IP address spoofing to generate the DNS response.

There has been work in recent years on network latency prediction, e.g., Network Coordination System (NCS) in the academic community, which can be used to assist site selection for GLB. However, the accuracy of those techniques to date is not high enough to make it leveraged in commercial GLB systems.

Geographic-based mapping is another example of a predication based method, which utilizes the IP address with a geographic location mapping database to get the location of a client and an application server, and computes the geographic distance between them as the site selection criteria. However, since geographic-based mapping inaccuracy exists, this prediction method is used in some GLB products as an assistant for site selection.

In the following detailed description of the present disclosure reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
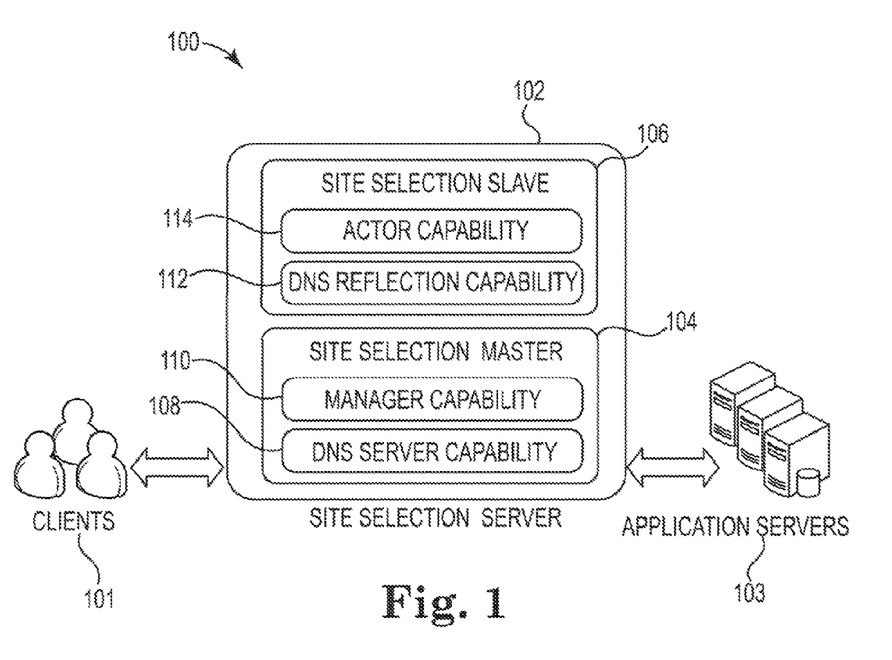
FIG. 1 illustrates an example of a server site selection system architecture according to the present disclosure.

FIG. 1 illustrates an example of a server site selection architecture 100 according to the present disclosure. As shown in FIG. 1, a number of clients are connected to a number of application servers 103 through a site selection server 102. The site selection server 102 is illustrated having a load balancing master 104 and a load balancing slave 106. The load balancing master 104 and the load balancing slave 106 are communicatively coupled. As used herein the term communicatively coupled is intended to represent an ability to exchange information, e.g., instructions and/or data, in an electrical, logical, physical, wired and/or wireless manner.

In the example of FIG. 1, the load balancing master 104 and the load balancing slave 106 are shown within the same computing device, e.g., site selection server 102. However, embodiments are not so limited and in other embodiments the load balancing master 104 and load balancing slave 106 may be remotely located from one another in a different computing devices.

According to embodiments, the load balancing master 104 can include a domain name server (DNS) capability 108 with extensions to support iterative control. The load balancing master 104 can also include a manager capability 110 to select among server sites, e.g., content and/or application server sites, to probe. In at least one embodiment, the load balancing master 104 can be a Global Load Balancing (GLB) master in a GLB system.

As shown in the example of FIG. 1, the load balancing slave 106 can include a DNS reflection capability 112, e.g., to measure a round trip time (RTT) between the load balancing slave 106 and a client local DNS server. The load balancing slave 106 can also include an actor capability 114, e.g., to respond to commands from the manager capability 110 and to report measured RTT to the load balancing master 104. In at least one embodiment, the load balancing slave 106 can be a Global Load Balancing (GLB) slave in a GLB system.

As used herein the term capability can include a module having a set of computer executable instructions (program instructions) intentionally purposed, when executed, to perform the acts, functions and tasks described herein.

In the example of FIG. 1, the DNS server capability 108 of the load balancing master 104 is configured to act as a DNS server for a domain of a particular server system having a number of servers 103, e.g., a number of content and/or application servers. The load balancing slave 106 is configured to send a Name Server (NS) response to the client local DNS server, as part of a DNS reflection capability 112. For example, a DNS reflection can be triggered by the load balancing master 104 either using a DNS CNAME response as introduced in Microsoft's DNS operations, or by sending a command message to the load balancing slave 106 as described herein.

In at least one embodiment, the actor capability 114 of the load balancing slave 106 is configured to receive commands from the manager capability of the load balancing master 104 and act on the same to trigger a DNS reflection from a DNS reflection capability 112. The DNS reflection capability is configured to receive follow-on DNS query from the client local DNS server and to leverage the DNS reflection. As part of the DNS reflection capability 112, the load balancing slave 166 can calculate an RTT upon receipt of the follow-on DNS query from the local DNS server in response to the NS response from the load balancing slave 106. According to embodiments, the actor capability 114 of the load balancing slave 106 is configured to report the RU and the server site selection result to the load balancing master 104 as part of a round of selection in the server site selection system 100. The load balancing master 104 and load balancing slaves 106 are also configured to iteratively process multiple rounds of selection on remaining server sites in the server site selection system 100.

Figure 2:
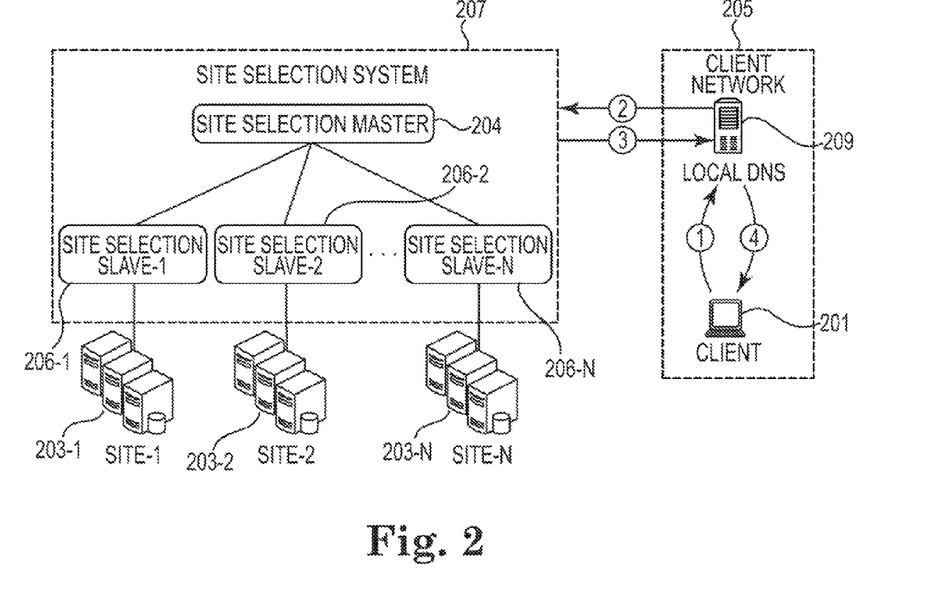
FIG. 2 illustrates example of a server site selection system according to the present disclosure.

FIG. 2 illustrates another example of a server site selection system 207 according to the present disclosure. The example of FIG. 2 illustrates a site selection system 207 between a client 201 and a plurality of server sites 203-1, 203-2, . . . , 203-N (e.g. SITE 1, SITE 2, . . . , SITE N). Each of the server sites can include a number of servers, e.g. content and/or application servers. In the example of FIG. 2, a site selection master 204, analogous to site selection master 104 in FIG. 1) is illustrated communicatively coupled to a plurality of site selection slaves 206-1, 206-2, . . . , 206-N, (e.g., SITE SELECTION SLAVE-1, SITE SELECTION SLAVE-2, . . . , SITE SELECTION SLAVE-N), which may be analogous to site selection slave 106 in FIG. 1.

As shown in the example of FIG. 2, each of the site selection slaves 206-1, 206-2, . . . , 206-N is associated with a respective one of the plurality of server sites 203-1, 203-2, . . . , 203-N.

In the example embodiment of FIG. 2, the site selection master 204 receives a domain name query (e.g., arrow 2) from a local Domain Name System (DNS) server 209 in a client network 205 as initiated by a client 201 (e.g., arrow 1). For example, the local DNS server 209 follows the standard (e.g., existing and/or proposed according to the Internet Engineering Task Force (IETF)) DNS operations and forwards the name resolution query from the client 201 to the load balancing master 204 serving as the DNS server for the associated application server domain name.

The site selection master 204 selects a server site 203-1, 203-2, . . . , 203-N (e.g., SITE 1 SITE 2, . . . , SITE N), and an associated co-located site selection slave 206-1, 206-2, . . . , 206-N, using a first technique. According to various embodiments, using a first technique includes using a DNS reply race technique, using IP-Geographic mapping, etc.

The site selection master 204 then will trigger a DNS reflection between the local DNS server 209 and a co-located site selection slave 206-1, 206-2, . . . , 206-N for a selected server site 203-1, 203-2, . . . , 203-N. The selected, co-located site selection slave 206-1, 206-2, . . . , 206-N sends a Name Server (NS) response (e.g., arrow 3) to the local DNS server 209 to delegate the selected, co-located site selection slave to resolve the domain name. After receiving the DNS NS response from the selected, co-located site selection slave 206-1, 206-2, . . . , 206-N, the local DNS server 209 will follow the delegation and send a follow on DNS query to the selected, co-located site selection slave 206-1, 206-2, . . . , 206-N.

According to embodiments, the selected, co-located site selection slave 206-1, 206-2, . . . , 206-N will receive the follow-on domain name query back from the local DNS server 209 based on the DNS reflection. The selected, co-located site selection slave 206-1, 206-2, . . . , 206-N leverages the DNS reflection to measure a Round Trip Time (RTT) between the selected, co-located site selection slave 206-1, 206-2, . . . , 206-N and the local DNS server 209.

The co-located site selection slave 206-1, 206-2, . . . , 206-N, probed in the current round, will respond to the local DNS server 209 with an IP address of a selected server site 203-1, 203-2, . . . , 203-N. The local DNS server 209 will follow the standard (e.g., existing and/or proposed according to the Internet Engineering Task Force (IETF)) DNS operations and forward the DNS response, including the IP address of the selected server site 203-1, 203-2, . . . , 203-N (e.g., arrow 4) to the client 201. The probed, co-located site selection slave 206-1, 206-2, . . . , 206-N additionally reports the site selection ((e.g., SITE 1, SITE 2, . . . , SITE N) and the RTT to the load balancing master 204. According to embodiments, the site selection result and corresponding RTT will be stored in site selection system 205. The above example operations are referred to as a round of selection in the site selection system 205. According to embodiments the above example of a first round of selection may be referred to as a course selection technique.

In an iterative phase of the server site selection system 207, the load balancing master 204 and the load balancing slaves 206-1, 206-2, . . . , 206-N are configured to iteratively process multiple rounds of selection on remaining server sites server site 203-1, 203-2, . . . , 203-N (e.g., SITE 1, SITE 2, . . . , SITE N). For example, the load balancing master 204 selects a next server site 203-1, 203-2, . . . , 203-N (e.g., SITE 1, SITE 2, . . . , SITE N) using the first technique, e.g. using a DNS reply race technique, using IP-Geographic mapping, etc., and repeats the trigger and receipt actions of a DNS reflection, each time reporting a result to the load balancing master 204.

In one example embodiment, triggering and receiving the DNS reflection associated with the domain name query and reporting a result to the load balancing master 204 is repeated until all server sites are processed. Additionally, triggering and receiving the DNS reflection associated with the domain name query and reporting a result to the load balancing master 204 can be repeated until selection sites converge. For example, triggering and receiving the DNS reflection associated with the domain name query and reporting a result to the load balancing master 204 can include repeating until a selectable threshold number of sites have been measured or a selectable, acceptable threshold RTT is reached.

Thus, using the load balancing master 204 to select a server site 203-1, 203-2, . . . , 203-N (e.g., SITE 1, SITE 2, . . . , SITE N), and associated, co-located load balancing slave 206-1, 206-2, . . . , 206-N, in a given round of selection is not a final decision of the given round. Instead, in each round the load balancing master 204 will trigger a DNS reflection between the client's local DNS server and a co-located load balancing slave 206-1, 206-2, . . . , 206-N of the selected server site 203-1, 203-2, . . . 203-N. After receiving the NS response from a load balancing slave 206-1, 206-2, . . . , 206-N, the client's 201 local DNS server 209 will follow the delegation and send a follow-on DNS query to the selected load balancing slave 206-1, 206-2, . . . , 206-N, which leverages the DNS reflection to measure the RTT between the selected, co-located load balancing slave 206-1, 206-2, . . . , 206-N and the lien 201 local DNS server 209.

According to embodiments, the selected load balancing slave 206-1, 206-2, . . . , 206-N in the server site selection system 207 compares the measured RTT of the current round with previous measured data to select a server site 203-1, 203-2, . . . , 203-N with a lowest RTT, and then responds to the client's local DNS server with an IP address of the selected server site 203-1, 203-2, . . . , 203-N with the lowest RTT. As mentioned above, after all server sites 203-1, 203-2, . . . , 203-N have been processed or a convergence is reached, e.g., a selectable threshold number of sites have been measured or a selectable, acceptable threshold RTT is reached, the load balancing master 204 in the server site selection system can respond to the client's 201 local DNS server 209 with an IP address of a final selected site among the plurality of server sites 203-1, 203-2, . . . , 203-N.

In at least one example embodiment, a dynamic Time-To-Live (TTL) process is used with the triggered DNS response sent back to the local DNS server 209. For example, a TTL can be included as a selectable option of a record in the DNS response. The option of a record can specify an expiration time of that returned record. Before the TTL expires, the local DNS server 209 can keep the record in local cache, for example, and return the record to the client 201 when a name resolution query comes for that record. When TTL expires, the local DNS server 209 triggers a new DNS query again to the authoritative DNS server, e.g., load balancing master 204.

In this example, the TTL option can be set dynamically in the DNS response, to speed up the site selection convergence process. For example, the TTL can be configurable before and after the convergence. Before results converge, the TTL value can be set to small values (e.g., 5 seconds or less) relative to default values. After convergence, the TTL value can be set to large values (e.g., default TTL values defined in a DNS configuration file).

Hence, embodiments of the present disclosure offer wide coverage in that the systems and methods can be used with all local DNS systems in a sever site selection process. This is possible since the DNS reflection technique leverages standard (e.g., existing and/or proposed) DNS operations as defined, for example, in specifications from the Internet Engineering Task Force (IETF). Fast convergence for server site selection may be realized compared with previous DNS reflection techniques. For example, the system and methods of the present disclosure may reach a threshold convergence with a limited number of iterations. Additionally, dynamic TTL can be leveraged to accelerate the convergence. Further, high responsiveness and low latency may be realized since selecting a server site using a first technique, e.g., DNS reply race, IP-Geographic mapping, etc., will initially narrow down a pool of selectable server sites 203-1, 203-2, . . . , 203-N (e.g., SITE 1, SITE 2, . . . , SITE N). The iteration phase can then quickly, further converge the selectable server sites 203-1, 203-2, . . . , 203-N based on reported RTT measurements and comparisons after consecutive rounds of iteration.

Figure 3:
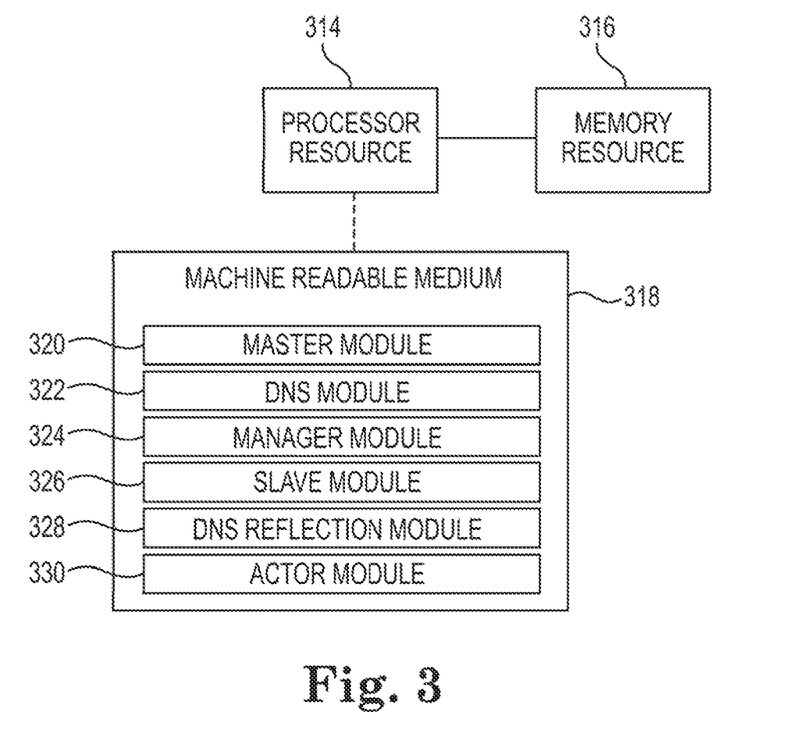
FIG. 3 is a block diagram illustrating a processing resource, a memory resource, and a machine readable medium according to an example embodiment of the present disclosure.

FIG. 3 is a block diagram illustrating an example of a processing resource 314, a memory resource 316, and a machine readable medium 318 according to the present disclosure. The processing resource 314 and the memory resource 316 can be local to a computing device, such as on a router, switch, server or other network device, etc. The machine readable medium 318 (e.g., a tangible, non-transitory computer readable medium) and/or the memory resource 316 can store a set of machine readable instructions (e.g., program instructions in the form of software, firmware, etc.) executable by the processing resource 314. The machine readable medium 318 can be local to a computing device or remote therefrom. For those examples in which the machine readable medium is remote from the computing device, the instructions can be loaded into the memory resource 316 of the computing device.

As used herein, a processing resource 314 can include one or a plurality of processors such as in a parallel processing system. A memory resource 316 can include memory addressable by the processing resource 314 for execution of machine readable instructions 318, e.g., program instructions. The memory resource 316 can include volatile and/or non-volatile memory such as random access memory (RAM), static random access memory (SRAM), electronically erasable programmable read-only memory (EEPROM), magnetic memory such as a hard disk, floppy disk, and/or tape memory, a solid state drive (SSD), flash memory, phase change memory, etc. The machine readable medium 318 can also be stored in remote memory managed by a server and represent an installation package that can be downloaded, installed, and executed.

As shown in the example embodiment of FIG. 3, the machine readable medium 318 includes master module 320 (e.g., a Global Load Balancing (GLB) master module), a DNS module 322, a manager module 324, a slave module 326 (e.g., a GLB slave module), a DNS reflection module 328, and an actor module 330. The number of modules 320, 322, 324, 326, 328, and 330 include program instructions to perform particular acts, tasks and/or functions as described herein when executed by the processing resources 314.

The number of modules 320, 322, 324, 326, 328, and 330 can be modules and/or sub-modules of other modules. For example the DNS module 322 and the manager module 324 can be sub-modules and/or contained within the master module 320. The DNS reflection module 328 and the actor module 330 can be sub-modules and/or contained within the slave module 326. Embodiments are not limited to these examples and the number of modules 320, 322, 324, 326, 328, and 330 can be individual modules separate and distinct from one another.

By way of illustration and not by way of limitation, the master module 320 can include instructions that can be executed to manage two sub-modules, the DNS module 322 and the manager module 324. In this example, the DNS master module 320 works, as a controller of the GLB system, e.g., system 207 in FIG. 2. The GLB master module 320 can include the DNS module 322 which executes instructions to act as a DNS server for a domain associated with an application domain name with additional executable instructions to support control of iterations of server site selection as described herein. Hence, the DNS module, under the control of the GLB master module 320, can receive a domain name query from a local Domain Name System (DNS) server as initiated by a client.

The GLB master module 320 can include the manager module 324 which, under control of the GLB master module 320, executes instructions to determine (e.g., select) a server site (e.g., server sites 203-1, 203-2, . . . , 203-N in FIG. 2) to probe using a first technique. As described above, a first technique can include executing instructions to trigger a DNS reply race, perform IP-Geographic mapping, etc. Embodiments are not limited to these first technique examples.

In this example the slave module 326 can include instructions that can be executed to manage two sub-modules, the DNS reflection module 328 and the actor module 330. The DNS reflection module 328 can include instructions that are executed to conduct a DNS reflection between the DNS reflection module 328 and a client local DNS server (e.g., 209 in FIG. 2) and measure a Round Trip Time (RTT) therebetween. The actor module 330 can include instructions that are executed to act according to commands from the GLB master module 320 (e.g., 204 in FIG. 2) and to report measure RTT to the GLB master module 320.

For example, the actor module 330 can receive a trigger from the manager module 324 and act to cause the a DNS reflection module 328 execute instructions to send to the client's local DNS a Name Server (NS) response which delegates a GLB slave, co-located with the selected server site, to resolve the domain name query. The DNS reflection module 328 can then execute instructions to receive a follow-on DNS query back from the local DNS based on the DNS reflection. The DNS reflection module 328 can execute instructions to leverage the DNS reflection, e.g., follow-on DNS query, to measure a Round Trip Time (RTT) between the GLB slave and the local DNS server. The actor module 330 can then execute instructions to report the RTT to the GLB master module 320.

In at least one embodiment, the DNS reflection module can include instructions that can be executed to include a dynamic Time-To-Live (TTL) record in the DNS reflection response to the client's local DNS server that specifies an expiration time of that returned record. As described herein, the TTL value may be set to small values, e.g. 5 seconds or less, relative to default TTL values before results convergence. And, the TTL value may be set, e.g., restored, to larger values, e.g., default values defined in a DNS system configuration file, after results converge.

The above process, e.g., site selection result and corresponding RTT, can be considered a round of server site selection in a server site selection system, e.g., GLB system. Program instructions can be executed to report and store the site selection result and corresponding RTT to the server site selection system and then the DNS module 322 (to support iteration control) and the manager module 324 may execute instructions to select a next server site using the first technique and the trigger and receipt actions, using the actor module 330 and the DNS reflection module 328, may be repeated until a convergence, e.g., all sites are processed or a selectable threshold is reached.

Figure 4:
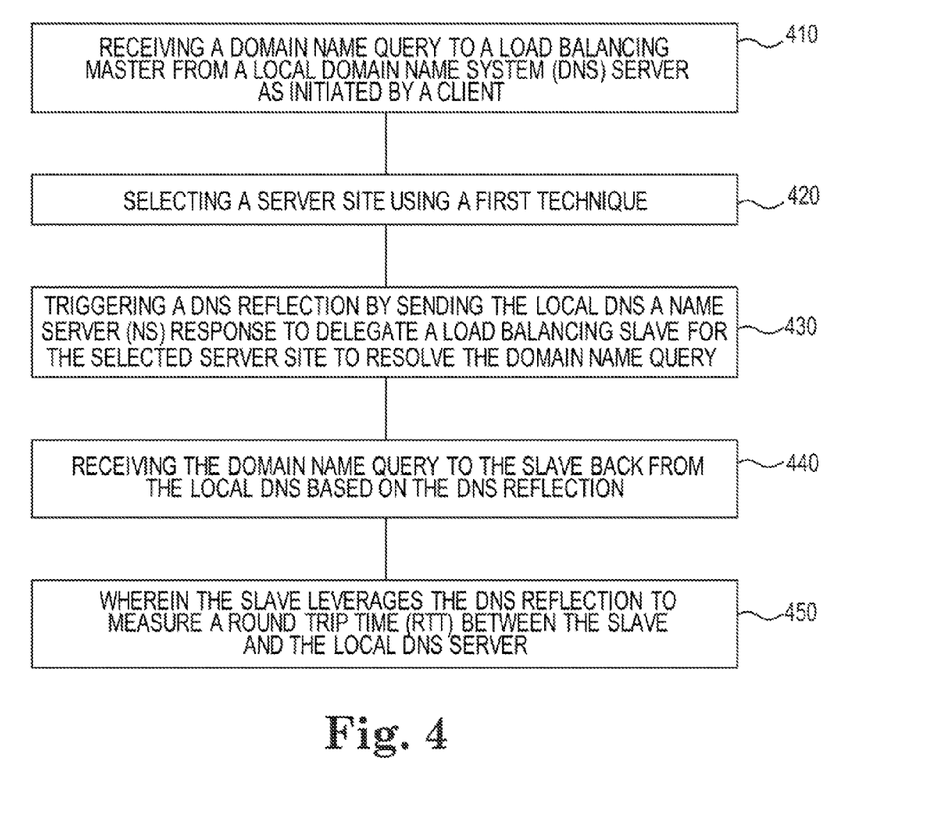
FIG. 4 illustrates an example method for server site selection according to the present disclosure.

FIG. 4 illustrates an example method for server site selection according to the present disclosure. As shown at block 410 the method includes receiving a domain name query to a load balancing master from a local Domain Name System (DNS) server as initiated by a client. For example, a load balance master, e.g., 204 in FIG. 2 and 322 in FIG. 3, can execute instructions to act as a DNS server for a domain associate with a application domain name. In at least one embodiment the load balancing master can be a Global Load Balancing (GLB) master as part of a GLB system.

At block 420 the method includes selecting a server site using a first technique. For example a manager module, e.g., 324 in FIG. 3, can execute instructions to select a server site using a first technique. Examples of selection a server site using a first technique include selecting a server site using a DNS reply race technique, using IP-Geographic mapping technique, etc. Embodiments are not limited to these examples.

At block 430 the method includes triggering a DNS reflection by sending the local DNS server a Name Server (NS) response to delegate a load balancing slave for the selected server site to resolve the domain name query. For example, an actor module, e.g., 330 in FIG. 3, can act according to a load balancing master's command, e.g., 204 in FIGS. 2 and 320 in FIG. 3, to cause a DNS reflection module, e.g., 328 in FIG. 3, to send the local DNS server an NS response which delegates a load balancing slave (e.g., 206-1, 206-2, . . . , 206-N in FIG. 2), co-located to a selected server site (e.g., 203-1, 203-2, . . . , 203-N in FIG. 2), to resolve the domain name. In at least one embodiment, the load balancing slave can be a Global Load Balancing (GLB) slave as part of a GLB system.

At block 440 the method includes receiving a follow-on domain name query to the load balancing slave back from the local DNS server based on the DNS reflection, e.g., completing a DNS reflection. At block 450 in the example of FIG. 4, the load balancing slave leverages the DNS reflection to measure a Round Trip Time (RTT) between the load balancing slave and the local DNS server. For example, the DNS reflection module can execute instructions to receive the follow-on DNS query and calculate the RTT.

In at least one embodiment, triggering and receiving the DNS reflection and the domain name query includes executing instructions to report a result of the RTT measurement back to the load balancing master. The triggering and receiving the DNS reflection and the domain name query and reporting a result to the load balancing master are repeated until all server site are processed. Alternatively, triggering and receiving the DNS reflection and the domain name query and reporting a result to the load balancing master are repeated until selection sites converge. In yet, another embodiment, triggering and receiving the DNS reflection and the domain name query and reporting a result to the load balancing master are repeated until a threshold is reached, e.g., until five (5) rounds of selection are completed. In each round of selection the pool of selectable server sites can be reduced, e.g., in a $4^{th}$ round only three (2) sites remain, etc. In this example, the embodiments include instructions that are executable to selectable to configure the threshold either in a predetermined and/or dynamic manner according to a particular design specification.

Hence, embodiments of the present disclosure provide a wide coverage in that the systems and methods can be used with all local DNS servers for server site selection since the DNS reflection technique leverages accepted DNS operations defined in current and/or proposed DNS specifications from the Internet Engineering Task Force (IETF). Additionally, the present embodiments may realize faster convergence than is available with previous DNS reflection techniques. For example, limited iterations are used to reach meaningful server site selection. In a Time To Live (TTL) example embodiment, the convergence may be accelerated even more noticeably. Further, the present embodiments realize a high accuracy since, in a first round, an approximately favored server selection site, in terms of responsiveness, is realized. And, this fact is leveraged and improved upon according to the consecutive rounds of iteration.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

The term "a number of" is meant to be understood as including at least one but not limited to one.

What is claimed is:

1. A server site selection system, comprising:
    a hardware processor;
    a load balancing master coupled to the hardware processor, including:
        a domain name server (DNS) capability which, when executed by the hardware processor, executes extensions to support iterative control; and
        a manager capability which, when executed by the hardware processor, selects a server site from a pool of server sites to probe;
    a load balancing slave communicatively coupled to the master, the slave including:
        a DNS reflection capability which, when executed by the hardware processor, measures a round trip time (RTT) between the load balancing slave and a client local DNS server by leveraging a DNS reflection; and
        an actor capability which, when executed by the hardware processor, responds to commands from the manager capability and reports a measured RTT to the load balancing master,
    wherein the load balancing master and the load balancing slave:
        iteratively perform successive rounds of selection on the pool of server sites until a convergence condition is reached, wherein the convergence condition is reached if the measured RTT is less than a first threshold or the number of rounds is greater than a second threshold; and
        select a site based on the measured RTT and responds to the client local DNS server with an IP address corresponding to the selected site after the convergence condition has been reached.

2. The system of claim 1, wherein the load balancing master acts as a DNS server for a domain of a content and/or application server.

3. The system of claim 1, wherein the load balancing slave is to send a Name Server (NS) response to the client local DNS server upon a trigger caused by the load balancing master.

4. The system of claim 1, wherein the load balancing slave is to receive a DNS query from the client local DNS server to leverage the DNS reflection.

5. The system of claim 1, wherein the load balancing slave is to report the measured RTT and a server site selection result to the load balancing master in a round of selection in the server site selection system.

6. A method for server site selection, comprising:
    receiving a domain name query to a Global Load Balancing (GLB) master from a local Domain Name System (DNS) server as initiated by a client;
    iteratively performing successive rounds of site selection until a convergence condition is reached;
    wherein performing each successive round of site selection comprises:
        selecting a server site from a pool of server sites using a technique;
        triggering a DNS reflection by sending the local DNS a Name Server (NS) response to delegate a GLB slave for the selected server site to resolve the domain name query;
        receiving the domain name query to the GLB slave back from the local DNS based on the DNS reflection;
        measuring, by the GLB slave, a Round Trip Time (RTT) between the GLB slave and the local DNS server by leveraging the DNS reflection; and
        reporting, by the GLB slave, the measured RTT to the GLB master; and
        determining if the convergence condition has been reached;
    wherein determining if the convergence condition has been reached comprises:
        comparing the measured RTT to a first threshold;
        comparing the number of rounds performed to a second threshold; and
        if the RTT is less than the first threshold or the number of rounds is greater than the second threshold, the convergence condition has been reached, otherwise, the convergence condition has not been reached;
    after the convergence condition has been reached, selecting a site based on the measured RTT; and
    responding to the local DNS server with an IP address corresponding to the selected site.

7. The method of claim 6, wherein selecting a server site using the technique includes using a DNS reply race technique.

8. The method of claim 6, wherein selecting a server site using the technique includes using IP-Geographic mapping.

9. The method of claim 6, wherein triggering and receiving the DNS reflection and the domain name query includes reporting a result to the GLB master.

10. The method of claim 9, wherein triggering and receiving the DNS reflection and the domain name query and reporting a result to the GLB master includes repeating until all server site are processed.

11. A non-transitory computer-readable medium storing a set of instructions executable by a processor, wherein the set of instructions are executed by the processor to:
    receive a domain name query to a Global Load Balancing (GLB) master from a local Domain Name System (DNS) server as initiated by a client;
    iteratively perform successive rounds of site selection until a convergence condition is reached; wherein, in each successive round of site selection, the set of instructions are executed to:
        select a server site from a pool of server sites using a technique;
        trigger a DNS reflection by sending the local DNS a Name Server (NS) response to delegate a GLB slave for the selected server site to resolve the domain name query;
        receive the domain name query to the GLB slave back from the local DNS based on the DNS reflection;
        measure, by the GLB slave, the measured a Round Trip Time (RTT) between the GLB slave and the local DNS server by leveraging the DNS reflection; and report, by the GLB slave, the measured RTT to the GLB master;
select a site based on the measured RTT after the convergence has been reached; and
respond to the local DNS server with an IP address corresponding to the selected site, wherein if the RTT is less than the first threshold or the number of rounds is greater than the second threshold, the convergence condition has been reached, otherwise, the convergence condition has not been reached.

12. The medium of claim 11, wherein a dynamic Time-To-Live (TTL) is used in the triggered DNS reflection to receive a new domain name query when the TTL is expired, and wherein the dynamic TTL is determinable before and after the convergence.

* * * * *